United States Patent
McHardy et al.

(10) Patent No.: US 9,961,134 B2
(45) Date of Patent: May 1, 2018

(54) METHODS AND SYSTEMS FOR AUTO-STARTING AND AUTO-STOPPING DATABASES

(71) Applicants: Ian Roger McHardy, Waterloo (CA); Ivan Thomas Bowman, Hammonds Plains (CA); Karim Khamis, Kitchener (CA)

(72) Inventors: Ian Roger McHardy, Waterloo (CA); Ivan Thomas Bowman, Hammonds Plains (CA); Karim Khamis, Kitchener (CA)

(73) Assignee: SYBASE, INC., Dublin, CA (US)

( * ) Notice: Subject to any disclaimer, the term of this patent is extended or adjusted under 35 U.S.C. 154(b) by 543 days.

(21) Appl. No.: 14/486,232

(22) Filed: Sep. 15, 2014

(65) Prior Publication Data
US 2016/0080217 A1    Mar. 17, 2016

(51) Int. Cl.
*H04L 29/08* (2006.01)
*G06F 11/34* (2006.01)
*G06F 17/30* (2006.01)
*H04W 4/00* (2018.01)
*H04L 12/26* (2006.01)

(52) U.S. Cl.
CPC .......... *H04L 67/10* (2013.01); *G06F 11/3409* (2013.01); *G06F 17/3056* (2013.01); *H04W 4/003* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 7,287,082 B1* | 10/2007 | O'Toole, Jr. | H04L 67/1008 709/223 |
| 9,497,257 B1* | 11/2016 | Love | H04L 67/06 |
| 2002/0112054 A1* | 8/2002 | Hatanaka | H04L 29/06 709/225 |
| 2003/0074453 A1* | 4/2003 | Ikonen | H04L 29/06 709/228 |
| 2005/0038831 A1* | 2/2005 | Souder | G06F 17/3038 |
| 2006/0136448 A1* | 6/2006 | Cialini | G06F 17/30306 |
| 2011/0138052 A1* | 6/2011 | Caplan | G06F 9/505 709/226 |

(Continued)

*Primary Examiner* — David T Brooks
(74) *Attorney, Agent, or Firm* — Schwegman Lundberg & Woessner, P.A.

(57) ABSTRACT

Systems and methods are presented for auto-starting and auto-stopping databases in a cloud server environment. In some embodiments, a method includes accessing, by an initial server in a network-based system, a request to connect to a target database located in a target server of the network-based system. The method can include determining, by an administrative database residing in the initial server, a location of the target database residing in the target server, switching an execution context from no database in the target server to a copy of the administrative database in the target server, performing an auto-start procedure to auto-start the target database in the target server, switching the execution context from the administrative database in the target server to the target database in the target server, and transmitting a completion acknowledgement indicating the target server is connected to the target database.

18 Claims, 5 Drawing Sheets

(56) References Cited

U.S. PATENT DOCUMENTS

| | | | | |
|---|---|---|---|---|
| 2011/0314266 A1* | 12/2011 | Mondri | ................... | G06F 9/485 |
| | | | | 713/2 |
| 2014/0304306 A1* | 10/2014 | Proctor | ............. | G06F 17/30306 |
| | | | | 707/803 |
| 2015/0066865 A1* | 3/2015 | Yara | .................. | G06F 17/30289 |
| | | | | 707/667 |
| 2015/0095343 A1* | 4/2015 | Divilly | .................. | H04L 67/327 |
| | | | | 707/741 |

* cited by examiner

METHODS AND SYSTEMS FOR AUTO-STARTING AND AUTO-STOPPING DATABASES

TECHNICAL FIELD

The subject matter disclosed herein generally relates to the processing of data in a cloud environment. In some example embodiments, the present disclosures relate to methods and systems for auto-starting and auto-stopping databases.

BRIEF DESCRIPTION OF THE DRAWINGS

Some embodiments are illustrated by way of example and not limitation in the figures of the accompanying drawings.

DETAILED DESCRIPTION

Example methods, apparatuses and systems are presented for auto-starting and auto-stopping databases in a cloud server environment.

Client databases stored in a cloud server environment of an enterprise system are not all used with the same frequency. For example, some databases may be accessed constantly, while others may be accessed once a month or once a quarter, say at the end of a company's financial period. It may be efficient to run frequently-used databases more regularly or even all the time, while for less frequently-used databases, it may be more efficient to start the database only when there is a request to access it.

In a cloud server environment, where multiple servers may be coupled and where each server can store multiple databases, a client may not know an exact location of a database, e.g., which server or what location in the server the client wishes to access. In some cases, the client database may be moved from one server to another without the client noticing, for load balancing purposes, for example. In general, the client may have no desire to know where exactly the database is located, and may have simply the objective of being able to access the client database on demand.

In this context, as it may be inefficient to keep the infrequently-used databases running constantly; rather, it may be desirable to auto-start these infrequently-used databases when the client sends requests to access these databases, and otherwise keep these infrequently-used databases shut down. As used herein, "auto-starting" a database may refer to automatically starting a target database on behalf of a client request without the client knowing or needing to know the location of the target database within a server or multiple servers, and without the client needing to know if the target database is running or not. For similar reasons, it may be desirable to "auto-stop" a database after all clients are no longer accessing the database. "Auto-stopping" a database may refer to automatically shutting down operation of the database when no longer in use without the client knowing or needing to know that the database is being shut down.

Aspects of the present disclosure are presented for auto-starting and auto-stopping databases in a cloud server environment. In some example embodiments, an administrative database (admin DB) common to each server in the cloud server environment may be utilized to manage the auto-starting procedure. In some example embodiments, concurrent connection requests are also managed to eliminate request collisions and errors. In some example embodiments, an auto-stopping procedure is also conducted after it is determined that no user is accessing the target database for a predetermined length of time. In some example embodiments, the auto-stopping procedure includes provisions for handling requests to access the database while the auto-stop procedure is commencing. These and other example details according to aspects of the present disclosure will be described in more detail according to the example figures and associated descriptions below.

Figure 1:
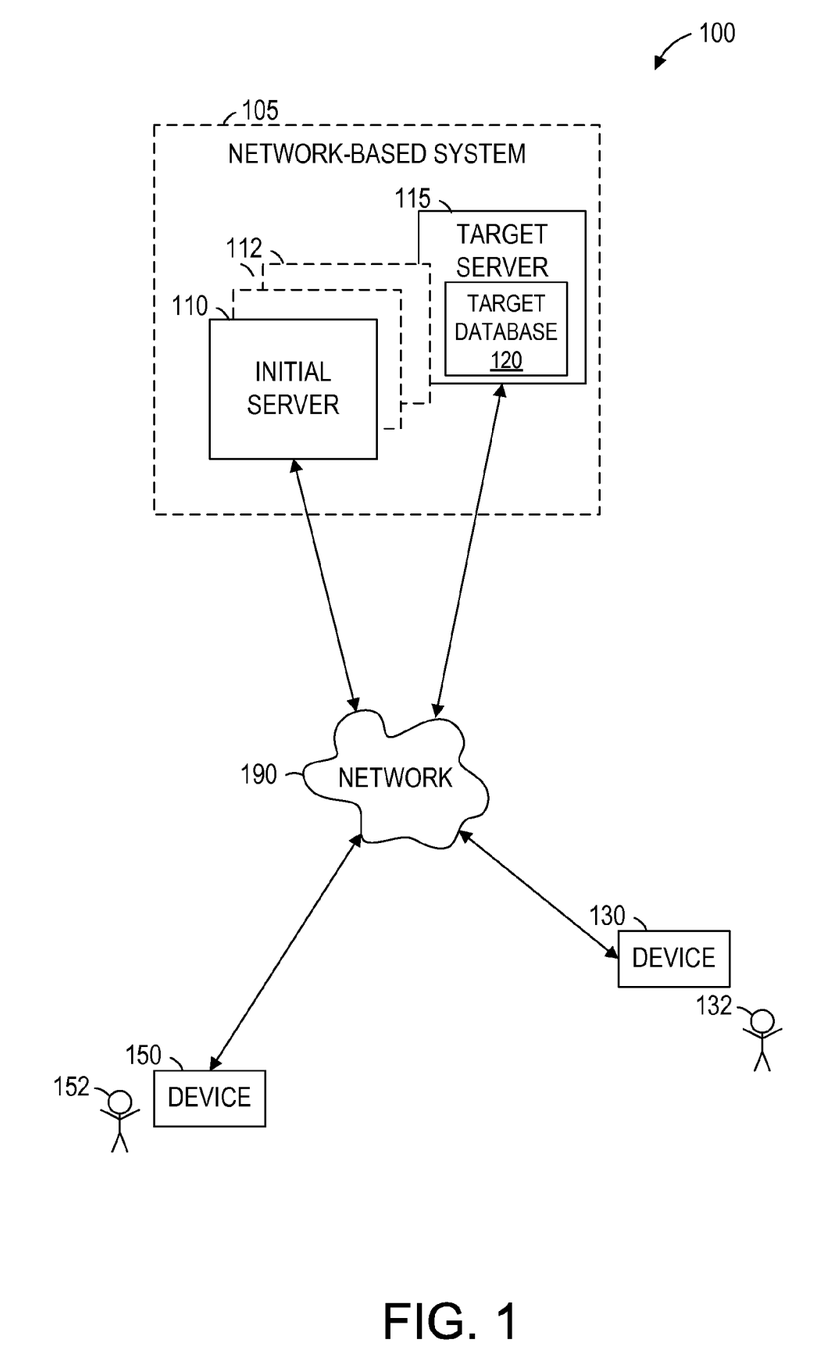
FIG. 1 is a network-based system environment suitable for performing auto-starting and auto-stopping according to some example embodiments.

Referring to FIG. 1, a network environment 100 suitable for performing auto-starting and auto-stopping is presented, which may be one example implementation of how the present disclosures interact with one or more users, according to some example embodiments. The network environment 100 includes a network-based system 105, containing a plurality of servers communicatively coupled to each other and accessible to multiple users, e.g. users 132 and 152, via a network 190. The network-based system 105 may be accessed initially by a user, such as user 132, with device 130, through an initial server 110. The user 132 may wish to access a target database 120 located somewhere within the plurality of servers, but may not know which server to access. The initial server 110 may be coupled to a target server 115 that is storing the target database 120, as well as multiple other servers 112. The initial server 110 and target server 115 may form all or part of the network-based system 105 (e.g., a cloud-based server system configured to provide one or more services to the devices 130 and 150), while in other cases can also include multiple other servers 112. The plurality of servers 110, 112, and 115 and the devices 130 and 150 may each be implemented in a computer system, in whole or in part, as described below with respect to FIG. 5.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 may not be part of the network environment 100, but may be associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 may not be part of the network environment 100, but may be associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 5. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the initial server 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
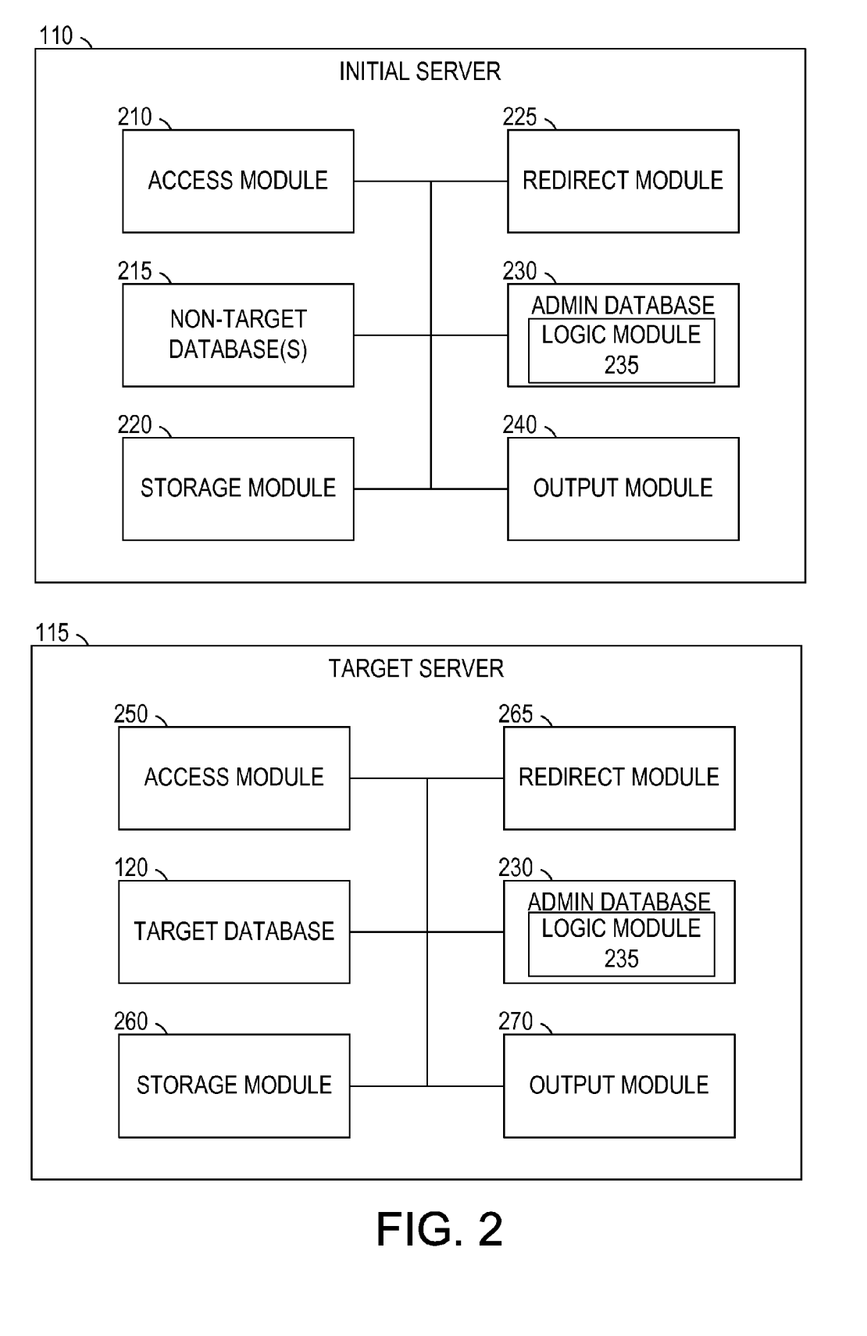
FIG. 2 illustrates block diagrams of an initial server and a target server in the network-based system environment, according to some example embodiments.

Referring to FIG. 2, the block diagrams shown illustrate components of the initial server 110 and the target server 115, according to some example embodiments. The initial server 110 is shown as including an access module 210, one or more non-target databases 215, a storage module 220, a redirect module 225, an admin database 230, and an output module 240, all configured to communicate with each other (e.g., via a bus, shared memory, or a switch). Any one or more of the modules and databases described herein may be implemented using hardware (e.g., one or more processors of a machine) or a combination of hardware and software. For example, any module or database described herein may configure a processor (e.g., among one or more processors of a machine) to perform the operations described herein for that module or database. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The access module 210 may be configured to interface with a client, such as user 132 or 152 through device 130 or 150 via network 190. Storage module 220 may be configured to store data in the initial server 110. In some cases, the non-target database(s) 215 may be stored in the storage module 220. Redirect module 225 may be configured to switch contexts between one database and another. In some cases, the redirect module 225 may redirect the client's interface from no database in the initial server 110 to another database residing on a different server in the network-based system 105. The admin database 230 may be a database that resides on each server in the network-based system 105, and may be configured to keep track of the locations of each database in the network-based system 105. In some cases, the admin database 230 can also verify whether a particular database called by the client is configured to be auto-started or not. The logic module 235 may reside in the admin database 230, and may be configured to run a procedure that determines whether the target database 120 resides on the initial server 110. In some cases, the logic module 235 can be accessed through the admin database 230 without actually connecting to the admin database 230. The output module 240 can be configured to display or otherwise present data and other information to the client through the initial server 110 and other display means, not shown. In some cases, the output module 240 can be configured to transmit text and other data to a display module, which may reside in another device, such as device 130 or 150.

Still referring to FIG. 2, the target server 115 may include its own separate access module 250, storage module 260, redirect module 265, and output module 270, each of which may be configured to operate in similar manners described with respect to the initial server 110. The target server 115, however, contains the target database 120 that is the database intended to be accessed by the client. The client may not know that the target database 120 resides in the target server 115, and the target database 120 may not be active or spawned before the client requests to access it. Thus, in some cases, the target server 115 and the initial server 110 are one and the same. In some cases, the target database 120 is stored in the storage module 260. The target server 115 also may contain its own copy of the admin database 230, also including the logic module 235 that is configured to perform the same logic as in the initial server 110. In some cases, all of the copies of the admin database 230 residing on each of the plurality of servers in the network based system 105 are synced together, in that changes made to any copy of the admin database 230 on any of the servers will be propagated to all the copies of the admin database 230 on all the other servers. Thus, in some cases, running an admin database 230 on one server can allow the network-based system 105 to switch contexts from the one server to another server while still running the admin database 230 on the other server.

Figure 3:
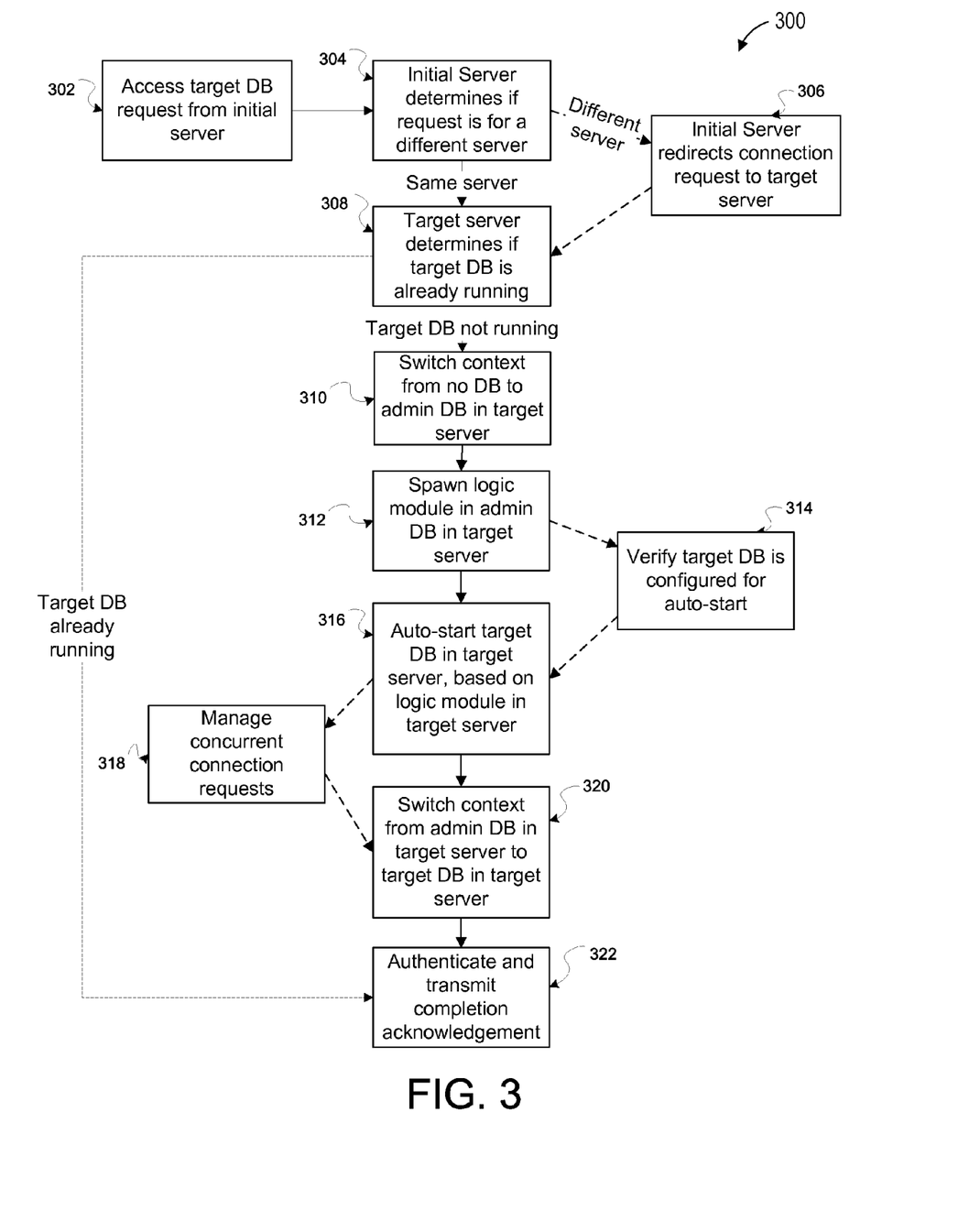
FIG. 3 is a flowchart illustrating an example method for performing an auto-starting procedure of a database in the network-based system environment, according to some example embodiments.

Referring to FIG. 3, the functional flow diagram illustrates an example method 300 for auto-starting a target database in a cloud server environment, according to some example embodiments. The described example process can be implemented by, for example, the network-based system 105.

At operation 302, in some example embodiments, the initial server 110 may access a request from a client, such as user 132 or 152, to reach a target database 120. In some example embodiments, the client may initially be interfacing with the admin database 230 residing on the initial server 110 upon initiating the client request. The client may not know which database or server he has initially connected with, and the client may not know where the target database 120 is located among the plurality of servers contained in the network-based system 105. Ultimately, the client may simply be concerned with connecting to the target database 120.

At operation 304, in response to the client request, the initial server 110 may determine if the client request of the target database 120 should be directed to somewhere within the initial server 110 or be redirected to a different server. In some cases, the admin database 230 of the initial server 110 may be accessed to make this determination. If it is determined that the target database 120 resides on a different server, then the example method 300 proceeds to operation 306. Otherwise, if the target database resides on the initial server, the example method 300 proceeds directly to operation 308. At operation 306, assuming the target database 120 resides on a different server, the initial server 110 redirects the connection request to the target server 115. In some cases, the admin database 230 of the initial server 110 may be utilized to make this redirection. After redirection, the method 300 may proceed to operation 308.

At operation 308, the target server 115 may determine if the target database 120 is already running. In some cases, the admin database 230 on the target server 115 may be utilized to make this determination. In some cases, the target server 115 may be the same as the initial server 110, provided it was previously determined that the initial server 110 included the target database 120. In other cases, the target server 115 is a different server than the initial server 110, provided it was previously determined that a different server included the target database 120. If it is determined that the target database 120 is already running, then the procedure of the example method 300 may complete by proceeding directly to operation 322, described below. If it is determined the target database 120 is not already running, then the example method 300 may proceed to operation 310.

At operation 310, the target server 115 may switch execution context from no database, e.g., the current execution context is not accessing any database, to the admin database 230 residing in the target server 115. From here, the target server 115 can start running the auto-start procedures to help connect the client to the target database 120.

At operation 312, the logic module 235 in the admin database 230 of the initial server 110 may be spawned, in order to perform at least some of the logic routines for the auto-start procedure. In some cases, the logic module 235 can be run without being compiled, as the program logic may be provided in a database language such as SQL.

At operation 314, in some example embodiments, the network-based system 105 may verify whether the target database 120 is configured for auto-start. To do this, in some example embodiments, the network-based system 105 may cross-check the name of the target database 120 based on the request by the client with a list of auto-start databases, stored for example in the admin database 230. In some cases, this cross-check may be performed in the target server 115 using the admin database 230 copy located in the target server 115. In other cases, this cross-check may be performed by a different server, such as in the initial server 110, using the admin database 230 copy located in the different server, in some example embodiments.

At operation 316, the auto-start procedure may be performed to start the target database 120. The routine may be initiated by the logic module 235 residing on the target server 115. Thus, according to some aspects of the present disclosure, another database starts the target database 120, rather than a user starting the target database 120. In addition, because the admin database 230 is synced with all of the copies on each of the other servers, starting at target database 120 through a routine on the admin database 230 can reduce errors when performing the auto-start procedure for any database on any server, rather than relying on the target server 115 itself to auto-start the target database 120 residing on the target server 115. This is in part because the target database 120 may periodically move to different servers, so it would be more inefficient and unreliable to place the responsibility of auto-starting databases on each server itself.

In some example embodiments, at operation 318, additional procedures may be performed to manage any race conditions, such as if there are any concurrent requests to auto-start the same target database 120. Performing multiple concurrent auto-start procedures on the same target database 120 can have indeterminate results or result in errors, which might occur if the procedures in operation 318 might not be performed.

Thus, in some cases, the logic module 235 can perform routines to obtain various locks on the target database 120 and the target server 115. Here, locks can refer to obtaining a status that prevents other tasks in the network-based system 105 from accessing or modifying an object subject to the lock. Two kinds of locks include a shared lock and an exclusive lock. A shared lock on an object can prevent any other task by the network-based system 105 from modifying the state of the object. For example, holding a shared lock on a host or server ensures the host or server cannot be stopped (other than large systematic failure), moved or deleted while the lock is held. An exclusive lock on an object can prevent any other task by the network-based system 105 from accessing or modifying the object in any way. Note that if a database is running, an application accessing the network-based system 105 can still connect to the running database and query and modify it without being impacted by exclusive locks, since connecting to a running database would not constitute a task by the network-based system 105. A "host" may refer to a computer that is part of the network-based system 105. A host may be configured to run a server in the network-based system 105, for example. A "task" may refer to a procedure that runs on a server in the network-based system 105. A task can call one or more subtasks, and the subtasks can run on a different server (or servers), for example. When a task completes, either successfully or due to any error, any locks that were acquired by the task can be released. In some example embodiments, to manage any concurrent connection requests, an exclusive lock may be obtained for a database ID attribute of the target database 120. In some cases, attempting to obtain the lock will fail if the lock is already held by another task. If this happens, in some example embodiments, additional procedures include repeating attempting to obtain this exclusive lock until it is either obtained or a predefined time-out occurs.

At operation 320, the execution context can be switched from the admin database 230 in the target server 115 to the target database 120. The target database 120 may now be running, and thus the execution context can be successfully switched over from the admin database 230 to the target database 120. In this case, the execution context switch occurs within the target server 115.

At operation 322, the target server 115 can authenticate the client request to connect to the target database 120 and transmit a completion acknowledgment message to the client via the network 190. In some cases, the authentication can include verifying a proper user ID and password. The target database 120 may have this information available for verification. In some cases, the acknowledgment may be implicit in that no explicit message may be received, and instead other indications may be provided to show that the client has access to the target database 120.

Figure 4:
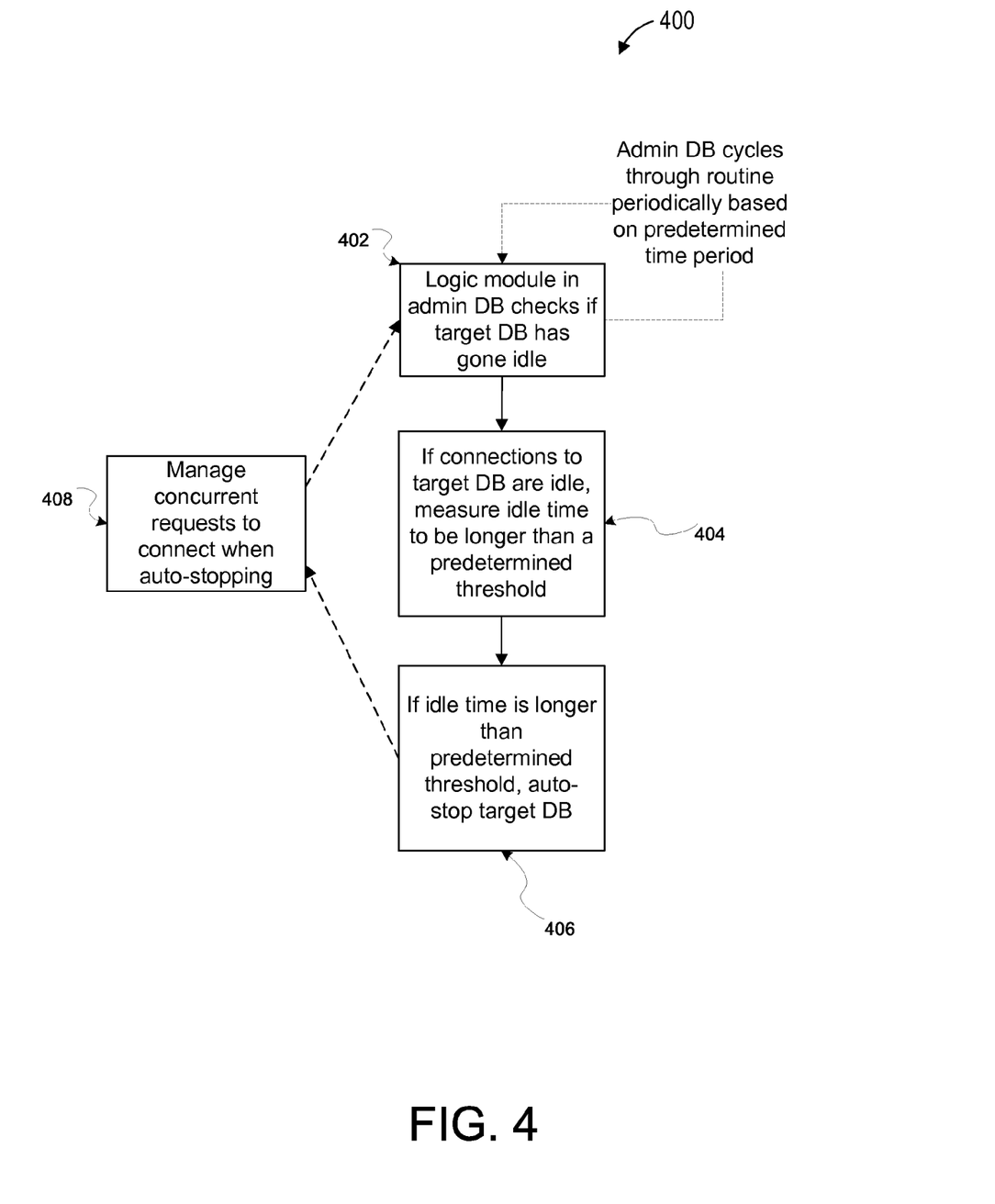
FIG. 4 is a flowchart illustrating an example method for performing an auto-stopping procedure of a database in the network-based system environment, according to some example embodiments.

Referring to FIG. 4, the flowchart illustrates an example method 400 for auto-stopping databases in a cloud server environment. Starting at operation 402, assuming the target database 120 had been auto-started, the target database 120 can also be suitable then for being auto-stopped at the appropriate time. The logic module 235 in the admin database 230 can check if the target database 120 has gone idle, meaning the target database 120 enters a state where there are no user connections. In some cases, a schedule of tasks to be performed by the admin database 230 can occur periodically, say every 30 seconds, for example. The admin database 230 may continually perform the check in operation 402 to see if the target database 120 has gone idle, periodically based on a predetermined time period.

At operation 404, if it is determined that the target database 120 is idle, the logic module 235 may then measure the idle time before proceeding to an auto-stop procedure. In some cases, it may be more efficient to auto-stop a target database 120 after the target database 120 is idle long enough, rather than immediately auto-stopping the database once it is determined that there are no connections currently connected.

At operation 406, if it is determined that the target database 120 is idle for longer than a predetermined threshold, the logic module 235 can perform the auto-stop procedure of target database 120. In some example embodiments, the threshold period may be 2 minutes long or 10 minutes long. In some example embodiments, at operation 408, the admin database 230 may also run procedures to handle cases where a client requests connection to the target database 120 while the auto-stop procedure is occurring. In some cases, the admin database 230 interrupts the process for shutting down the target database 120 when a request to connect to the target database 120 is received. Thus, the auto-stop procedure may reset back to operation 402, to determine periodically if the target database 120 goes idle.

Figure 5:
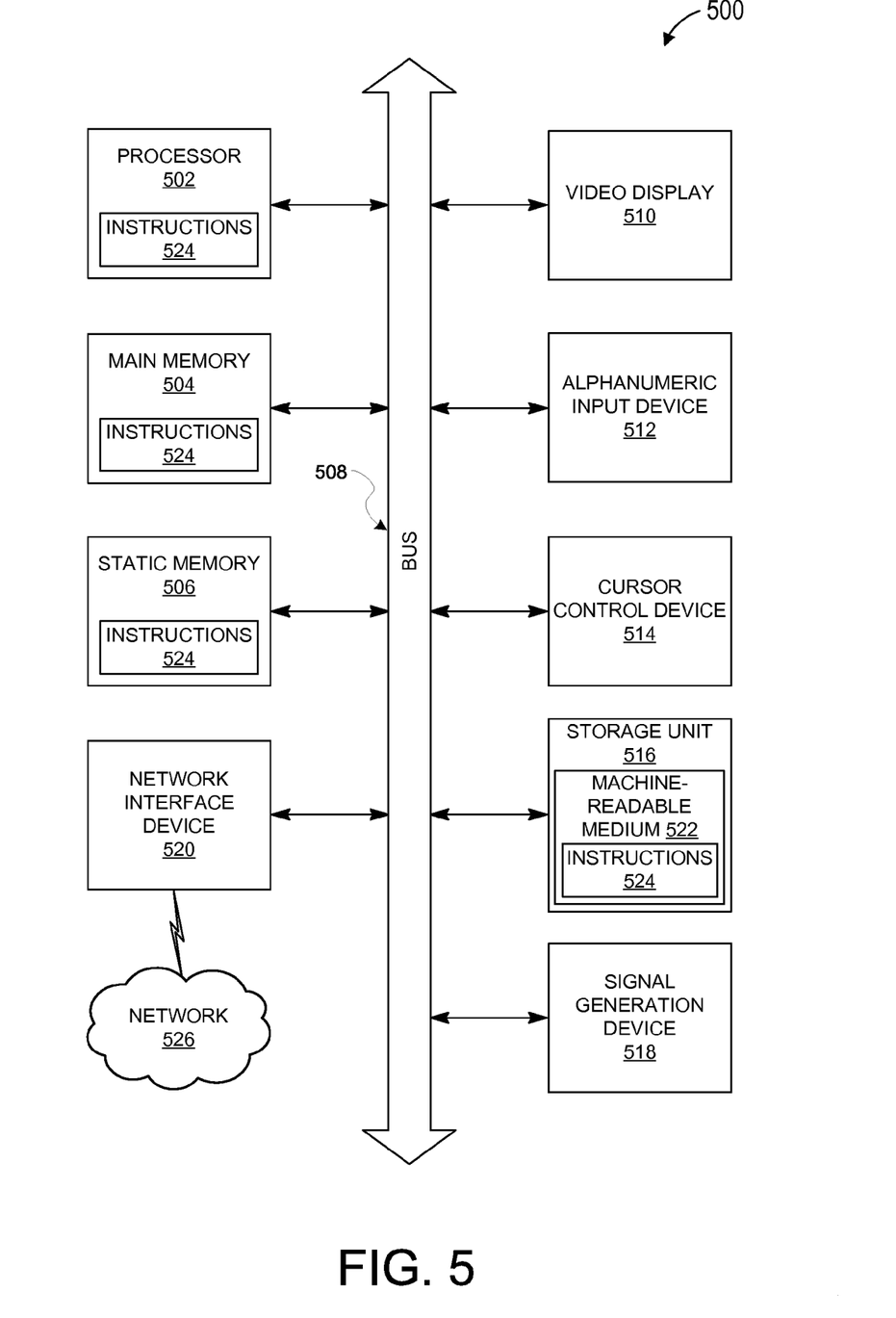
FIG. 5 is a block diagram illustrating components of a machine, according to some example embodiments, able to read instructions from a machine-readable medium and perform any one or more of the methodologies discussed herein.

Referring to FIG. 5, the block diagram illustrates components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an application, an applet, an app, or other executable code) for causing the machine 500 to perform any one or more of the methodologies discussed herein may be executed, in whole or in part.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a distributed (e.g., peer-to-peer) network environment. The machine 500 may include hardware, software, or combinations thereof, and may as examples be a server computer, a client computer, a personal computer (PC), a tablet computer, a laptop computer, a netbook, a cellular telephone, a smartphone, a STB, a PDA, a web appliance, a network router, a network switch, a network bridge, or any machine capable of executing the instructions 524, sequentially or otherwise, that specify actions to be taken by that machine. Further, while only a single machine 500 is illustrated, the term "machine" shall also be taken to include any collection of machines 500 that individually or jointly execute the instructions 524 to perform all or part of any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524, such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a video display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-readable medium 522 (e.g., a tangible and non-transitory machine-readable storage medium) on which are stored the instructions 524 embodying any one or more of the methodologies or functions described herein, including, for example, any of the descriptions of FIGS. 1-4. The instructions 524 may also reside, completely or at least partially, within the main memory 504, within the processor 502 (e.g., within the processor's cache memory), or both, before or during execution thereof by the machine 500. The instructions 524 may also reside in the static memory 506.

Accordingly, the main memory 504 and the processor 502 may be considered machine-readable media 522 (e.g., tangible and non-transitory machine-readable media). The instructions 524 may be transmitted or received over a network 526 via the network interface device 520. For example, the network interface device 520 may communicate the instructions 524 using any one or more transfer protocols (e.g., Hypertext Transfer Protocol (HTTP)). The machine 500 may also represent example means for performing any of the functions described herein, including the processes described in FIGS. 1-4.

In some example embodiments, the machine 500 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 522 able to store data temporarily or permanently and may be taken to include, but not be limited to, RAM, read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions 524. The term "machine-readable medium" shall also be taken to include any medium, or combination of multiple media, that is capable of storing the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 522 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors 502, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions described herein. As used herein, "processor-implemented module" refers to a hardware module implemented using one or more processors 502.

Similarly, the methods described herein may be at least partially processor-implemented, with a processor 502 being an example of hardware. For example, at least some of the operations of a method may be performed by one or more processors 502 or processor-implemented modules. As used herein, "processor-implemented module" refers to a hardware module in which the hardware includes one or more processors 502. Moreover, the one or more processors 502 may also operate to support performance of the relevant operations in a "cloud computing" environment or as a "software as a service" (SaaS). For example, at least some of the operations may be performed by a group of computers (as examples of machines 500 including processors), with these operations being accessible via a network 526 (e.g., the Internet) and via one or more appropriate interfaces (e.g., an API).

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 500. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 500 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, by one or more processors of a target server in a network-based system, a redirect request to connect to a target database (target DB) located in the target server, the redirect request to connect derived from an initial request to connect to the target DB accessed by an initial server in the network-based system, a location of the target DB in the target server determined by an administrative database (admin DB) residing in the initial server, the admin DB including locations for a plurality of target DBs with a portion of the plurality of target DBs configured for auto-start procedures;
   switching, by the one or more processors of the target server, an execution context from no database in the target server to a copy of the admin DB in the target server;
   determining, by the one or more processors of the target server using the admin DB in the target server, that the target DB is configured for an auto-start procedure, the configuration of the target DB determined by matching an identification of the target DB within the initial request to an identification, of an auto-start database of the target server, stored in the admin DB;
   determining, by the one or more processors of the target server using the admin DB in the target server, the target DB is executing an auto-stop procedure;
   performing, by the one or more processors of the target server using the admin DB in the target server, an interrupt procedure resetting the target DB back to a running state, the interrupt procedure including at least a portion of the auto-start procedure to auto-start the target DB in the target server;
   switching the execution context from the admin DB in the target server to the target DB in the target server; and
   transmitting, via a network, a completion acknowledgement indicating the target server is connected to the target DB.

2. The method of claim 1, further comprising determining whether the target DB is already running in the target server.

3. The method of claim 1, further comprising spawning a logic module in the admin DB of the target server, the logic module configured to perform the auto-start procedure of the target DB in the target server.

4. The method of claim 1, further comprising managing, by the admin DB in the target server, a concurrent request to connect to the target DB.

5. The method of claim 1, further comprising determining whether the target DB is idle by identifying a connection state of the target DB, the connection state indicating a number of user connections to the target DB.

6. The method of claim 5, further comprising measuring an idle time indicating a length of time the target DB is idle.

7. The method of claim 6, further comprising performing an auto-stop procedure when the idle time satisfies a predetermined threshold.

8. The method of claim 7, further comprising managing concurrent requests to connect to the target DB when performing the auto-stop procedure.

9. A network-based system, the network-based system comprising:
   an initial server comprising an administrative database (admin DB), the admin DB including locations for a plurality of target databases (target DB) with a portion of the plurality of target DBs configured for auto-start procedures;
   a target server coupled to the initial server and comprising a target DB of the plurality of target DBs and a copy of the admin DB;
   the initial server configured to access a request to connect to the target DB located in the target server of the network-based system;
   the admin DB of the initial server configured to:
      determine a location of the target DB residing in the target server; and
      redirect the request to connect to the target DB, from the initial server to the target server, upon determining the target DB resides on the target server; and
   the copy of the admin DB in the target server configured to:

switch an execution context from no database in the target server to the copy of the admin DB in the target server;

determine that the target DB is configured for an auto-start procedure, the configuration of the target DB determined by matching an identification of the target DB within the initial request to an identification, of an auto-start database of the target server, stored in the admin DB;

determine the target DB is executing an auto-stop procedure;

perform an interrupt procedure resetting the target DB back to a running state, the interrupt procedure including at least a portion of the auto-start procedure to auto-start the target DB in the target server;

switch the execution context from the admin DB in the target server to the target DB in the target server; and transmit a completion acknowledgement indicating the target server is connected to the target DB.

10. The system of claim 9, wherein the target server is further configured to determine if the target DB is already running in the target server.

11. The system of claim 9, wherein the copy of the admin DB in the target server is further configured to spawn a logic module in the admin DB of the target server, the logic module configured to perform the auto-start procedure of the target DB in the target server.

12. The system of claim 9, wherein the copy of the admin DB in the target server is further configured to manage a concurrent request to connect to the target DB.

13. The system of claim 9, wherein the copy of the admin DB in the target server is further configured to determine if the target DB is idle by identifying a connection state of the target DB, the connection state indicating a number of user connections to the target DB.

14. The system of claim 13, wherein the copy of the admin DB in the target server is further configured to measure an idle time indicating a length of time that the target DB is idle.

15. The system of claim 14, wherein the copy of the admin DB in the target server is further configured to perform an auto-stop procedure if the idle time satisfies a predetermined threshold.

16. The system of claim 15, wherein the copy of the admin DB in the target server is further configured to manage concurrent requests to connect to the target DB when performing the auto-stop procedure.

17. A machine-readable medium embodying instructions that, when executed by a processor, perform operations comprising:

accessing a request at an initial server to connect to a target database (target DB) located in a target server of the network-based system;

determining, by a processor using an administrative database (admin DB) of the initial server, a location of the target DB residing in the target server, the admin DB including locations for a plurality of target DBs with a portion of the plurality of target DBs configured for auto-start procedures;

switching an execution context from no database in the target server to a copy of the admin DB in the target server;

determining, by a processor using the admin DB in the target server, that the target DB is configured for an auto-start procedure, the configuration of the target DB determined by matching an identification of the target DB within the initial request to an identification, of an auto-start database of the target server, stored in the admin DB;

determining by the one or more processors of the target server using the admin DB in the target server, the target DB is executing an auto-stop procedure;

performing an interrupt procedure resetting the target DB back to a running state, the interrupt procedure including at least a portion of the auto-start procedure to auto-start the target DB in the target server;

switching the execution context from the admin DB in the target server to the target DB in the target server; and transmitting a completion acknowledgement indicating the target server is connected to the target DB.

18. The machine-readable medium of claim 17, wherein the operations further comprise:

upon determining that the target DB is idle, measuring an idle time indicating a length of time that the target DB is idle; and performing an auto-stop procedure if the idle time satisfies a predetermined threshold.

* * * * *